US008593065B2

(12) United States Patent
Tarsitano et al.

(10) Patent No.: US 8,593,065 B2
(45) Date of Patent: Nov. 26, 2013

(54) SYSTEMS, METHODS, AND APPARATUS FOR IMPROVING THE VISIBILITY AND IDENTIFICATION OF SATELLITES USING LIGHT EMITTING DIODES

(75) Inventors: Christopher George Tarsitano, Huntsville, AL (US); Renny Arthur Fields, El Segundo, CA (US); David Arthur Hinkley, El Segundo, CA (US)

(73) Assignee: The Aerospace Corporation, El Segundo, CA (US)

( * ) Notice: Subject to any disclaimer, the term of this patent is extended or adjusted under 35 U.S.C. 154(b) by 282 days.

(21) Appl. No.: 12/824,354

(22) Filed: Jun. 28, 2010

(65) Prior Publication Data

US 2011/0316423 A1 Dec. 29, 2011

(51) Int. Cl.

| | |
|---|---|
| ***H05B 37/02*** | (2006.01) |
| ***F21V 23/00*** | (2006.01) |
| ***H04B 10/00*** | (2013.01) |

(52) U.S. Cl.
USPC ............ 315/149; 398/125; 398/121; 398/124

(58) Field of Classification Search
USPC .......... 315/149; 398/125, 121, 124, 128, 130, 398/118; 455/12.1, 152.1, 427
See application file for complete search history.

(56) References Cited

U.S. PATENT DOCUMENTS 6,114,992 A 9/2000 Underbrink
7,925,167 B1 * 4/2011 Kozubal et al. ............... 398/125

* cited by examiner

*Primary Examiner* — Daniel D Chang
(74) *Attorney, Agent, or Firm* — Sutherland Asbill & Brennan LLP

(57) ABSTRACT

Certain embodiments of the invention may include systems, methods, and apparatus for improving the visibility and identification of satellites using light emitting diodes. According to an example embodiment of the invention, a method is provided for improving the visibility of satellites. The method can include attaching one or more light emitting diodes (LEDs) to a satellite, supplying one or more signals to the one or more LEDs, and producing light emission having a unique identifier from the one or more LEDs based at least in part on the one or more signals.

17 Claims, 4 Drawing Sheets

SYSTEMS, METHODS, AND APPARATUS FOR IMPROVING THE VISIBILITY AND IDENTIFICATION OF SATELLITES USING LIGHT EMITTING DIODES

STATEMENT OF GOVERNMENT INTEREST

This invention was make with government support under Contract No. FA8802-04-C-0001 awarded by the Department of the Air Force. The government has certain rights in the invention.

FIELD OF THE INVENTION

This invention generally relates to satellites, and in particular, to improving the visibility and identification of satellites using light emitting diodes.

BACKGROUND OF THE INVENTION

According to current estimates, more than 8000 man-made satellite objects are orbiting the earth. Tracking and identifying any particular one of these satellite objects from earth can present certain challenges, and typically requires a powerful telescope and illumination of the object by the sun. However, optimal solar illumination conditions usually occur in a limited time window near sunrise and sunset. Passively tracking satellites at night can pose additional challenges, and typically requires sophisticated infrared detectors and optics that are optimized for the infrared spectrum. Passively tracking satellites during the day is extremely difficult, if not impossible, due to background radiation.

Some satellites are very small and are even more difficult to identify and track. Satellite identification can also be problematic when there is more than one object in the field of view of a tracking telescope. Orbital parameters can be utilized to predict the orbit of a satellite; however, small errors in the orbital parameters can lead to an incorrect identification of a satellite. Imaging the target satellite is another method of identification, but this method is highly dependent upon the orientation of the satellite relative to the observer's view. In general, there is a very narrow window in which a satellite can be identified and passively tracked.

BRIEF SUMMARY OF THE INVENTION

Some or all of the above needs may be addressed by certain embodiments of the invention. Certain embodiments of the invention may include systems, methods, and apparatus for improving the visibility and identification of satellites using light emitting diodes.

According to an example embodiment of the invention, a method is provided for improving the visibility of satellites. The method can include attaching one or more light emitting diodes (LEDs) to a satellite, supplying one or more signals to the one or more LEDs, and producing light emission having a unique identifier from the one or more LEDs based at least in part on the one or more signals.

According to another example embodiment, a system is provided for improving the visibility of satellites. The system includes at least one satellite, one or more light emitting diodes (LEDs) having predetermined wavelength emission spectra, and attached to the at least one satellite. The system also includes at least one power source associated with the at least one satellite, and a circuit for supplying one or more signals to the one or more LEDs to produce light emission having a unique identifier based at least in part on the one or more signals.

According to another example embodiment, an apparatus is provided for improving the visibility of satellites. The apparatus includes a housing operable for attachment to a satellite. The housing includes one or more light emitting diodes (LEDs) having predetermined wavelength emission spectra, a circuit for supplying one or more signals to the one or more LEDs, and a power connector. The one or more LEDs are operable to produce light emission having a unique identifier based at least in part on the one or more signals or the one or more LEDs predetermined wavelength emission spectra.

Other embodiments and aspects of the invention are described in detail herein and are considered a part of the claimed invention. Other embodiments and aspects can be understood with reference to the following detailed description, accompanying drawings, and claims.

BRIEF DESCRIPTION OF THE FIGURES

Reference will now be made to the accompanying drawings, which are not necessarily drawn to scale, and wherein.

DETAILED DESCRIPTION OF THE INVENTION

Figure 1:
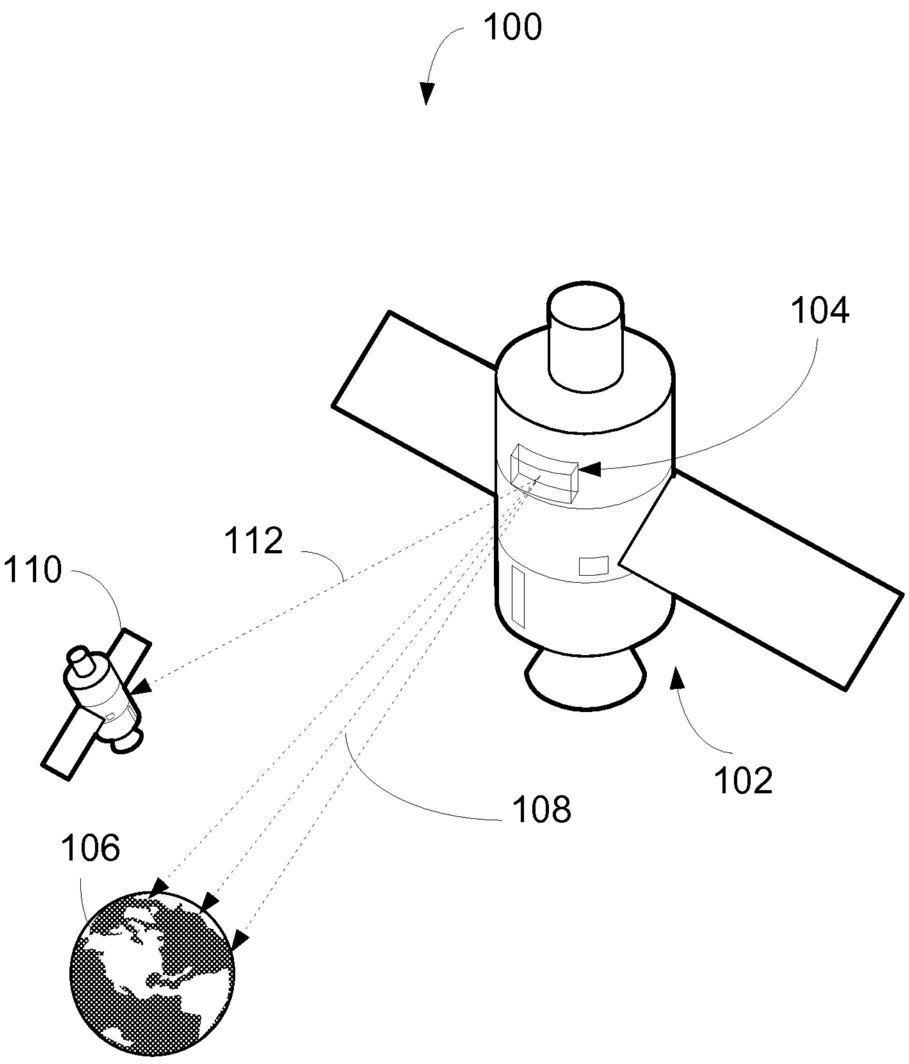
FIG. 1 is an illustrative diagram of a satellite with a light emitting diode assembly, according to an example embodiment of the invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Certain embodiments of the invention may enable the identification and tracking of a satellite object by installing one or more light emitting diodes (LEDs) on the satellite. According to certain example embodiments, the satellite may be identified and tracked by installing one or more LEDs on the satellite, where the LEDs may produce uniquely identifiable "fingerprint" signals that may include unique combinations of emission wavelength spectra (color) and/or time-domain modulation (pulsing patterns).

Commercial off-the-shelf (COTS) LEDs are available with wavelength emission spectra spanning sections of a large portion of the electromagnetic spectrum. These LEDs can be pulsed over a wide range of frequencies and waveforms. Modern LEDs are compact devices that possess low masses and have long lifetimes. A single high luminosity, prepackaged LED device typically occupies an area of approximately 30 $mm^2$ and weighs a little over 0.5 gram.

Compared with other light sources (such as incandescent and halogen bulbs with typical luminous efficiencies of 15 lumens/watt and 24 lumens/watt, respectively), LEDs are more efficient, and are available with high luminous efficiencies exceeding 40 lumens/watt. Therefore, according to certain example embodiments of the invention, lower electrical powers may be required to drive the LEDs to produce relatively high optical powers that may be visible from earth or from other satellites.

An additional benefit arises from accessing the visible region of the electromagnetic spectrum using LEDs. Sensor technology in the visible region is more technologically advanced and cheaper than sensors in the infrared region. But according to an example embodiment of the invention, it may be advantageous to choose a wavelength that is outside the visible region of the electromagnetic spectrum to hide the signature of the satellite. These wavelengths may then be detected using the proper detection optics optimized for the wavelength of the emission, according to example embodiments of the invention.

Satellites may be illuminated with laser radiation for the purposes of active tracking, calibrations, laser communications, etc. However, according to example embodiments of the invention, the signature from on-board LEDs can be used to ensure that the correct satellite is illuminated and thereby, protect sensitive, government, space-based assets from the unintentional illumination and communication with laser radiation.

According to example embodiments of the invention, power to drive the LEDs may be supplied by batteries on the satellites bus or by solar cells. In certain embodiments of the invention, the LEDs may be installed individually or in an array, and may be mounted to an exterior wall of a satellite. According to example embodiments of the invention, the number of LEDs may be tailored to match the desired brightness.

In an example embodiment of the invention, LEDs may be connected to a current source and/or a frequency generator. The frequency generator may be used to pulse the LEDs at a desired frequency and/or waveform pattern. The color or wavelength of the LEDs could be chosen such that little or no modifications are needed to the optical path of the ground station or observing satellite. For example, a ground station telescope or another satellite may track a satellite of interest by verifying the unique wavelength emission and modulation signature from the LEDs.

Various LEDs, power supplies, circuits, lenses, housings, etc., may be utilized in improving the visibility and enabling the passive tracking of a satellite, according to example embodiments of the invention. The various components will now be described with reference to the accompanying figures.

FIG. 1 shows a simplified pictorial diagram 100 of a satellite 102 with installed LED(s) 104. According to an example embodiment, the LED(s) 104 may provide light emission to the earth 106 via a light path 108. According to another example embodiment, the LED(s) 104 may provide light emission to a receiving satellite 110 via a light path 112.

Figure 2:
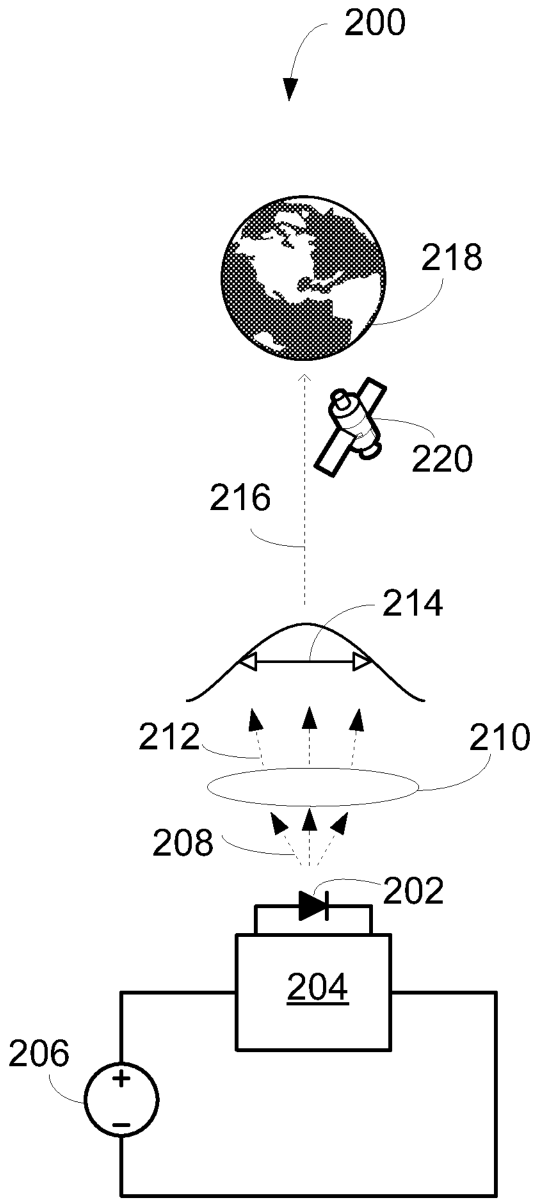
FIG. 2 is an illustrative diagram of satellite visibility schematic, according to an example embodiment of the invention.

FIG. 2 depicts an example satellite visibility schematic diagram 200, according to an example embodiment of the invention. In this diagram, a single LED is shown for clarity. However, several LEDs or an array of LEDs can be used according to example embodiments of the invention. According to an example embodiment of the invention, the LED(s) 202 may have a characteristic wavelength of emission. In certain embodiments, the LED(s) 202 may be mounted to a heat sink. According to an example embodiment of the invention, the heat sink may be a thermal-electric cooler or the exterior wall of the satellite. In accordance with an example embodiment of the invention, LED(s) signal circuitry 204 may be utilized to provide current and pattern for driving the LEDS(s) 202. In an example embodiment, the LED(s) signal circuitry 204 may include a frequency generator and a current source.

According to example embodiments of the invention, the modulation waveform of the emission from the LED(s) 202 may be controlled by the frequency generator. In other example embodiments of the invention, the frequency generator may be eliminated from the circuit (or disabled) if pulsed operation is not needed. Therefore, according to certain example embodiments, the LED(s) 202 may operate in continuous mode. In certain example embodiments, a switch may be included for turning the circuit on and off if needed (for example, to conserve power). In certain embodiments, the frequency generator may be programmed to drive the LED(s) 202 with predetermined pulse patterns, and at certain predetermined intervals. Therefore, according to an example embodiment of the invention, the programmable frequency generator may be used to conserve power.

In certain embodiments of the invention, current for driving the LED(s) 202 may be provided by the current source or power supply 206, which may include batteries from the satellites bus or solar cells. In certain embodiments of the invention, driving the LED(s) 202 with the current source may produce the LED light emission 208 needed for detecting and identifying the satellite. In certain embodiments, a ground station on earth 218, or a receiving satellite 220 may receive and process the emission 208 signature from the LED (s) 202 and identify the transmitting satellite by the signature.

In accordance with an example embodiment of the invention, FIG. 2 also shows a lens 210 that may be utilized to modify the LED light emission 208 divergence angle from the LED(s) 202 to produce a combined light divergence 212. The combined light divergence 212 may have a Full Width Half Max (FWHM) divergence angle 214 appropriate for concentrating a majority of the light from the LED(s) to the desired receiving device on earth 218 or in the receiving satellite 220. In certain embodiments, the lens 210 may include anti-reflection coatings to increase the optical throughput efficiency of the lens so that a higher power optical signal may be transmitted to the receiver.

Figure 3:
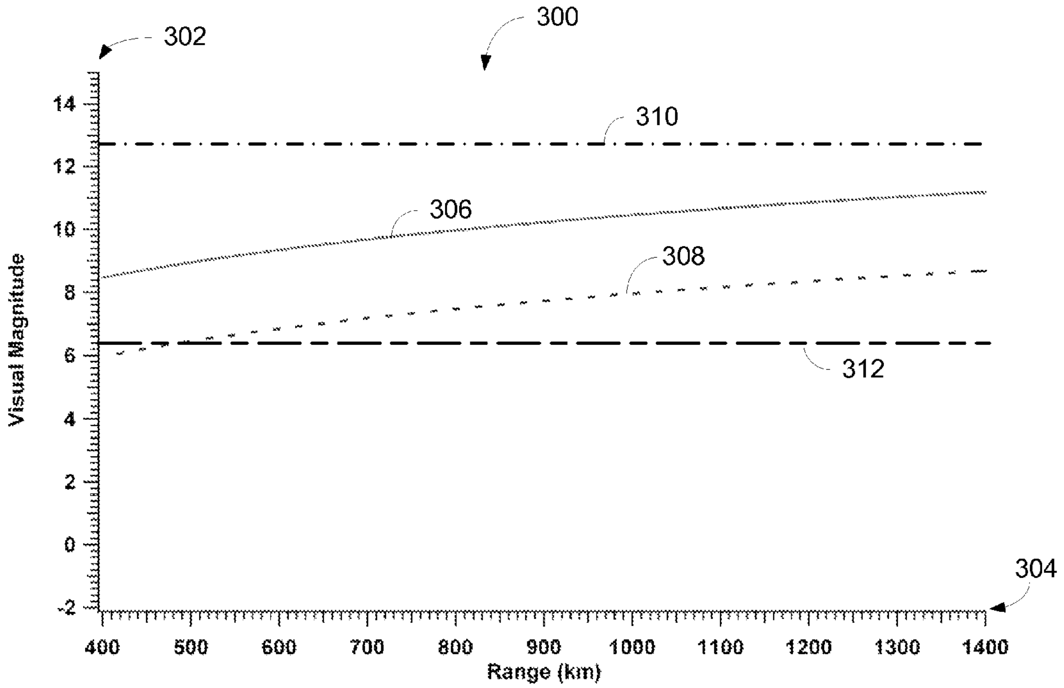
FIG. 3 is a graph of example visual detection magnitude comparisons, according to an example embodiment of the invention.

FIG. 3 depicts an example visual detection magnitude comparison graph 300, according to an example embodiment of the invention. Shown on the graph are example plots of visual magnitude 302 (y-axis) vs. range 304 (x-axis) for a single LED 306 and a 10 LED array 308. Also shown are theoretical visibility limits for an 8 inch telescope 310 in a populated area, and the visibility limits for the human eye under perfect conditions 312. The plots show results of calculations where the lens (as in the lens 210 of FIG. 2) was specified to give 50 degrees (full-width at half-maximum) combined divergence (as in FWHM divergence angle 214 of FIG. 2). In certain embodiments of the invention, a lens may be utilized to produce a smaller beam divergence, and may enable better reception at the ground station or receiving satellite. In example embodiments, the number of LEDs can be changed to meet power requirements and visibility. Also, in certain example embodiments of the invention, the LEDs may be modulated or pulsed, with more electrical power per pulse driving the LED than can be applied in the same time period when operating the LED continuously, resulting in higher brightness per pulse.

In certain embodiments of the invention, the LED(s) attached to the satellite may be used for producing light emission having a wavelength spectrum ranging from about 250 nanometers to about 30 microns. In other embodiments, the LED(s) attached to the satellite may be used for producing light emission having a wavelength spectrum ranging from about 600 nanometers to about 660 nanometers. In certain embodiments, signals may be provided by the LED signal circuitry (for example as in signal circuitry 204 of FIG. 2) and may supply one or more of DC current, modulated current, or pulsed current for driving one or more LEDs.

Figure 4:
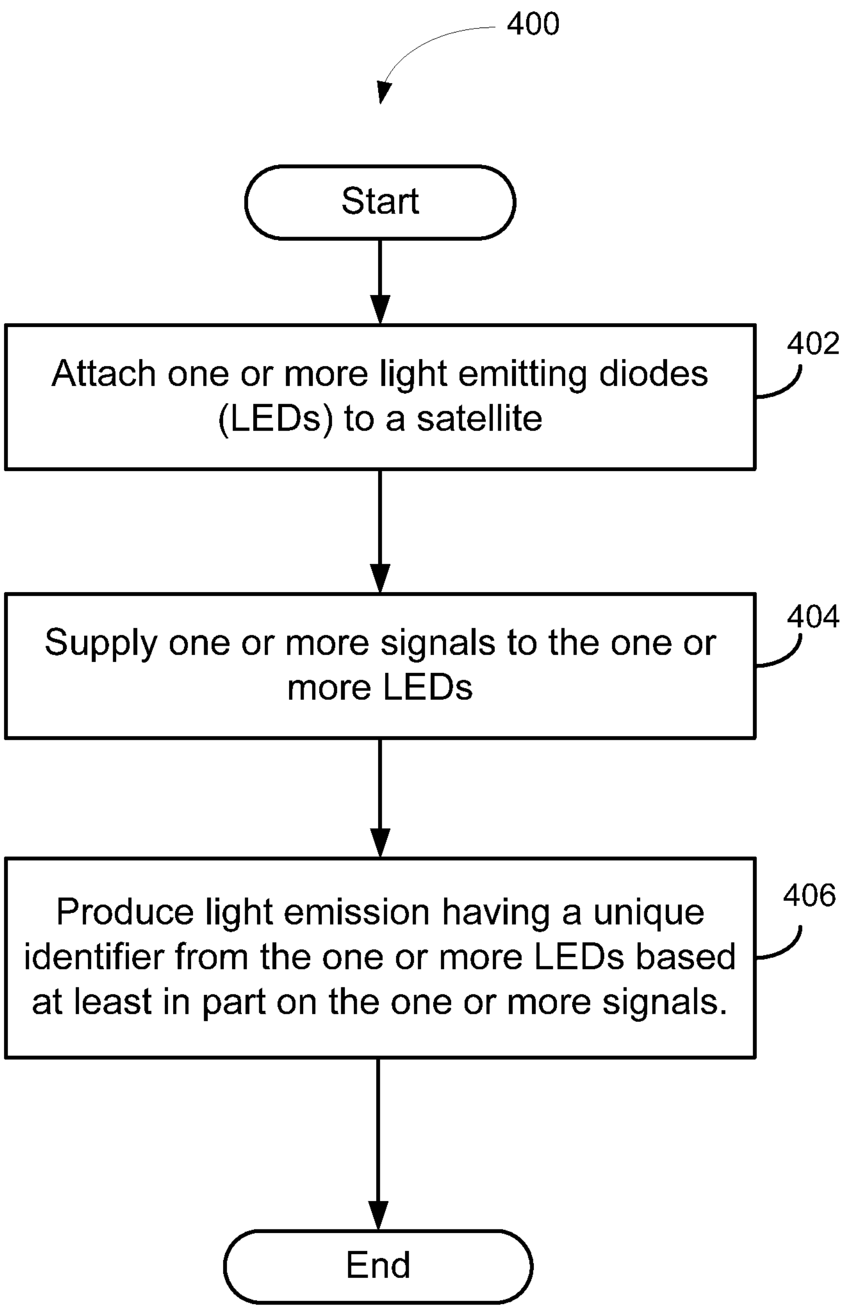
FIG. 4 is a flow diagram of an example method according to an example embodiment of the invention.

An example method 400 for improving the visibility of satellites will now be described with reference to the flow diagram of FIG. 4. The method 400 starts in block 402, and includes attaching one or more light emitting diodes (LEDs) to a satellite. In block 404, the method 400 includes supplying one or more signals to the one or more LEDs. In block 406, method 400 includes producing light emission having a unique identifier from the one or more LEDs based at least in part on the one or more signals. The method 400 ends after block 406.

Accordingly, example embodiments of the invention can provide the technical effects of creating certain systems, methods, and apparatus that provide cost effective, compact equipment that can be installed on satellites for identification and/or increased visibility. Example embodiments of the invention can provide the further technical effects of providing systems, methods, and apparatus for identifying a satellite by combinations of pulsing patterns and color emissions from one or more LEDs attached to the satellite.

In example embodiments of the invention, the LED signal circuitry 204 may include any number of hardware and/or software applications that are executed to facilitate any of the operations. As desired, embodiments of the invention may include a satellite LED system with more or less of the components illustrated in FIGS. 1 and 2.

The invention is described above with reference to the flow diagrams of systems, methods, apparatuses, and/or computer program products according to example embodiments of the invention. It will be understood that one or more blocks of the flow diagrams, and combinations of blocks flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the flow diagrams support combinations of means for performing the specified functions, combinations of elements or steps for performing the specified functions and program instruction means for performing the specified functions. It will also be understood that each block of the flow diagrams, and combinations of blocks in the flow diagrams, can be implemented by special-purpose, hardware-based computer systems that perform the specified functions, elements or steps, or combinations of special-purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for improving the visibility of satellites, comprising:

attaching one or more light emitting diodes (LEDs) to a satellite;

supplying one or more signals to the one or more LEDs, wherein the one or more LEDs have a predetermined wavelength emission spectra and a predetermined time-domain modulation; and producing a signature light emission associated with the satellite, the signature light emission having a unique self identifier from the one or more LEDs based at least on:

the one or more signals;

the predetermined wavelength emission spectra; and the time-domain modulation, wherein the signature light emission from the one or more LEDs enable identification and tracking of the satellite.

2. The method of claim 1, further comprising focusing the signature light emission.

3. The method of claim 1, wherein attaching the one or more LEDs comprises attaching the one or more LEDs to a heat sink or thermoelectric cooler.

4. The method of claim 1, wherein producing the signature light emission comprises producing at least a part of a wavelength spectrum ranging from about 250 nanometers to about 30 microns.

5. Currently The method of claim 1, wherein producing the signature light emission comprises producing at least a part of a wavelength spectrum ranging from about 600 nanometers to about 660 nanometers.

6. The method of claim 1, wherein supplying one or more signals comprises supplying one or more of DC current, modulated current, or pulsed current.

7. A system for improving the visibility of satellites, comprising:

at least one satellite;

one or more light emitting diodes (LEDs) having predetermined wavelength emission spectra and a predetermined time-domain modulation, and attached to the at least one satellite;

at least one power source associated with the at least one satellite; and a circuit for supplying one or more signals to the one or more LEDs to produce a signature light emission associated with the at least one satellite having a unique self identifier based at least on:

the one or more signals;

the one or more LEDs predetermined wavelength emission spectra: and the time-domain modulation, wherein the signature light emission from the one or more LEDs enable identification and tracking of the satellite.

8. The system of claim 7, further comprising a lens in communication with the one or more LEDs for focusing the signature light emission.

9. The system of claim 7, further comprising a thermal protection device attached to the satellite and in thermal communication with the one or more LEDs.

10. The system of claim 7, wherein the one or more LEDs are operable to produce the signature light emission in at least a portion of a wavelength spectrum ranging from about 250 nanometers to about 30 microns.

11. The system of claim 7, wherein the one or more LEDs are operable to produce the signature light emission in at least a portion of a wavelength spectrum ranging from about 600 nanometers to about 660 nanometers.

12. The system of claim 7, wherein the circuit for supplying one or more signals is operable to supply one or more of DC current, modulated current, or pulsed current to the one or more LEDs.

13. An apparatus for improving the visibility of satellites, comprising:

a housing operable for attachment to a satellite, the housing comprising:

one or more light emitting diodes (LEDs) having predetermined wavelength emission spectra and a predetermined time-domain modulation;

a circuit for supplying one or more signals to the one or more LEDs; and a power connector, wherein one or more LEDs are operable to:

produce a signature light emission associated with the satellite having a unique self identifier based at least in part on the one or more signals, the one or more LEDs predetermined wavelength emission spectra, and the time-domain modulation; and identify and track the satellite using the signature light emission.

14. The apparatus of claim 13, further comprising a lens in communication with the one or more LEDs for focusing the signature light emission.

15. The apparatus of claim 13, further comprising a thermal protection device attached to the satellite and in thermal communication with the one or more LEDs.

16. The apparatus of claim 13, wherein the one or more LEDs are operable to produce light emission in at least a portion of a wavelength spectrum ranging from about 250 nanometers to about 30 microns.

17. The apparatus of claim 13, wherein the circuit for supplying one or more signals is operable to supply one or more of DC current, modulated current, or pulsed current to the one or more LEDs.

* * * * *